United States Patent [19]
Bayer et al.

[11] Patent Number: 6,091,124
[45] Date of Patent: Jul. 18, 2000

[54] MICROMECHANICAL SENSOR FOR AFM/STM PROFILOMETRY

[75] Inventors: Thomas Bayer, Aidlingen-Dachtel; Johann Greschner, Pliezhausen; Helga Weiss, Gechingen, all of Germany

[73] Assignee: International Business Machines Corporation, Armonk, N.Y.

[21] Appl. No.: 08/876,167

[22] Filed: Jun. 13, 1997

[30] Foreign Application Priority Data

Jun. 13, 1996 [DE] Germany ............................ 196 23 510
Nov. 8, 1996 [DE] Germany ............................ 196 46 120

[51] Int. Cl.$^7$ .................................................. G01H 23/00
[52] U.S. Cl. ............................ 257/417; 73/105; 250/306; 250/307
[58] Field of Search ............................ 257/417; 73/105; 250/306, 307

[56] References Cited

U.S. PATENT DOCUMENTS

| | | | |
|---|---|---|---|
| 5,166,520 | 11/1992 | Prater et al. | 250/306 |
| 5,345,816 | 9/1994 | Clabes et al. | 73/105 |
| 5,347,854 | 9/1994 | Martin et al. | 73/105 |
| 5,382,795 | 1/1995 | Bayer et al. | 250/306 |
| 5,393,647 | 2/1995 | Neukermans et al. | 430/320 |
| 5,611,942 | 3/1997 | Mitsui et al. | 216/67 |
| 5,665,905 | 9/1997 | Bartha et al. | 73/105 |

*Primary Examiner*—Sara Crane
*Attorney, Agent, or Firm*—McGinn & Gibb, P.C.

[57] ABSTRACT

The invention pertains to a micromechanical sensor for AFM/STM profilometry which consists of a beam with a point for interaction with a test surface to be sampled on one end and a fixing block on the other end. The point consists of a basically conical shank with a countersunk point at the end of the shank. The micromechanical sensor has excellent mechanical rigidity and is particularly suited to the measurement of extremely deep and narrow structures with positive side flank angles.

19 Claims, 3 Drawing Sheets

MICROMECHANICAL SENSOR FOR AFM/STM PROFILOMETRY

The invention relates to a micromechanical sensor for AFM/STM profilometry, consisting of a beam with a point for interaction with a test surface to be sampled on one end and a fixing block on the other end.

BACKGROUND OF THE INVENTION

The scanning tunnelling microscope (STM) has contributed to the development of new micro characterisation processes which are based on the use of a very fine point. One such process is atomic force microscopy (AFM).

In the original design of AFM, described in G. Binnig, C. F Quate, C. Gerber, 1986, Atomic Force Microscope, Phys. Rev. Lett. 56, 930–933 and in EP-A-0 223 918, a sensor consisting of a spring-like beam which is rigidly fixed at one end and has a point at the other free end samples the surface of an object line by line. The deflection occasioned by the force between the surface of the object and the point can be measured with the greatest degree of accuracy.

Up until now, there have basically been two types of point used: conical points and countersunk points as described in European Patents EP-A-0 413 042, EP-A-0 413 041, EP-A-0 413 040 and EP-A-0 468 071, for example, as well as in the IBM Technical Disclosure Bulletin, vol. 37, No. 07, July 1994, pages 545–546.

FIG. 2a shows a conical point. The subjects for measurement using conical points are mainly surface roughness and step heights.

Countersunk heads as in FIG. 2b are particularly suitable for measuring structures with vertical flanks in order to measure the width, depth, flank angles or roughness of the side walls.

In most cases, only one material is used in the manufacture of points, this mainly being single-crystal silicon. The points described in EP-A-0 413 042 are constructed from thinly deposited films, e.g. from silicon nitride or silicon carbide. Single-crystal silicon has been shown to be particularly advantageous for working and shaping points. Countersunk points, in particular, with their requirements regarding height, diameter and overhang can only be manufactured at acceptable cost from this material.

In general, for the points used for measurement, the diameter of the point must be smaller than the structure to be measured. The diameter of the shank of a countersunk point is then smaller again than the diameter of the head of the point. The length and diameter of the vertical point shank determine the mechanical lateral rigidity of the point for stated materials.

If the rigidity is insufficient, then the point will adhere or stick to the side wall of the structure being measured during sampling, as shown in FIG. 3. The point can then only be removed from the side wall with difficulty. Even the distortion of the point shank as a result of attractive van der Waals forces between the point and the side wall can lead to erroneous measurements. In addition, particularly small countersunk heads are susceptible to damage during normal use.

SUMMARY OF THE INVENTION

The invention has for an object to provide a micromechanical sensor for AFM/STM profilometry which has sufficient mechanical rigidity and which is suitable for measuring very deep and narrow structures with positive flank angles.

The micromechanical sensor consists of a beam, on one end of which there is a point and at the other end of which there is a fixing block. The point consists of a basically conical shank with a countersunk point at the end of the shank.

Using the micromechanical sensor of the invention, structures can be measured which are not vertical. Due to the geometrical shape of the micromechanical sensor, the depth, width and surface profile of structures with positive side flank angles can be measured exactly. A further advantage of the micromechanical sensor is its ability to be manufactured more economically than those used previously.

It is particularly advantageous to coat the point with one or several thin layers. In this way, the rigidity of the micromechanical sensor can be improved and even the electrical or magnetic properties of the point can be adjusted as required. Further advantageous designs are set forth below.

BRIEF DESCRIPTION OF THE DRAWINGS

In the following, the invention is described in greater detail in connection with the figures in which.

DETAILED DESCRIPTION OF THE PREFERRED EMBODIMENTS

Figure 1:
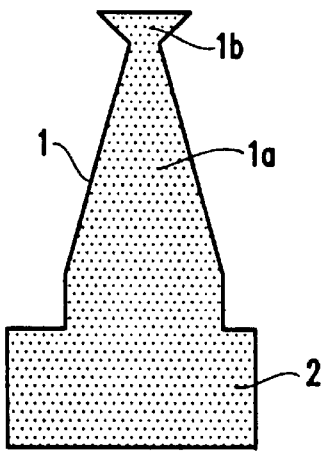
FIG. 1 is a schematic cross-section through the point of the micromechanical sensor as in the invention, FIGS. 2a and 2b each are a schematic cross-section through a point representing the current state of the art.
Figure 2A:
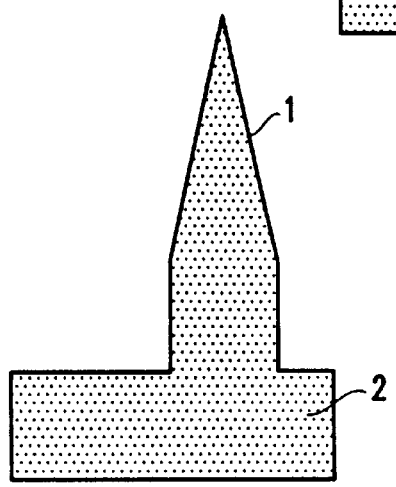
Figure 2B:
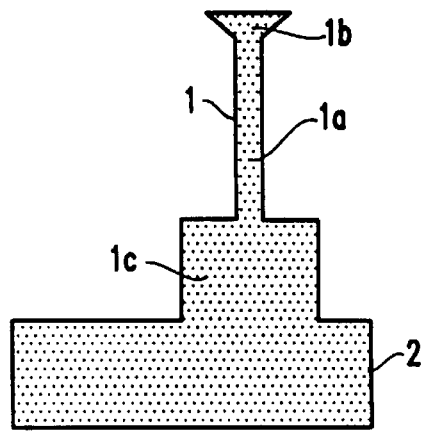
Figure 3:
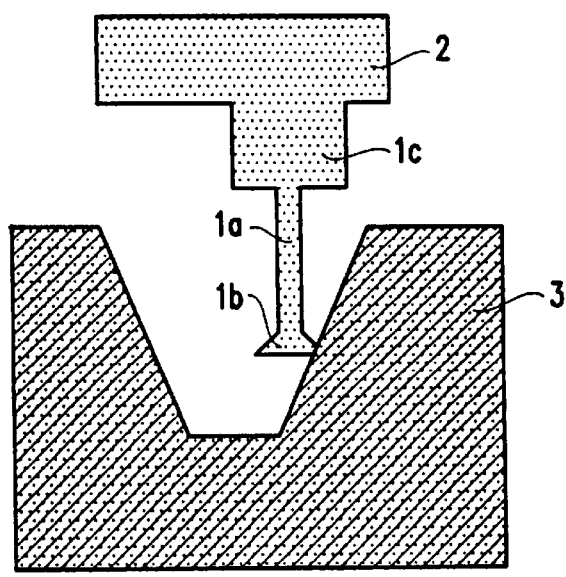
FIG. 3 is measuring the side walls of a structure using a countersunk point.
Figure 4:
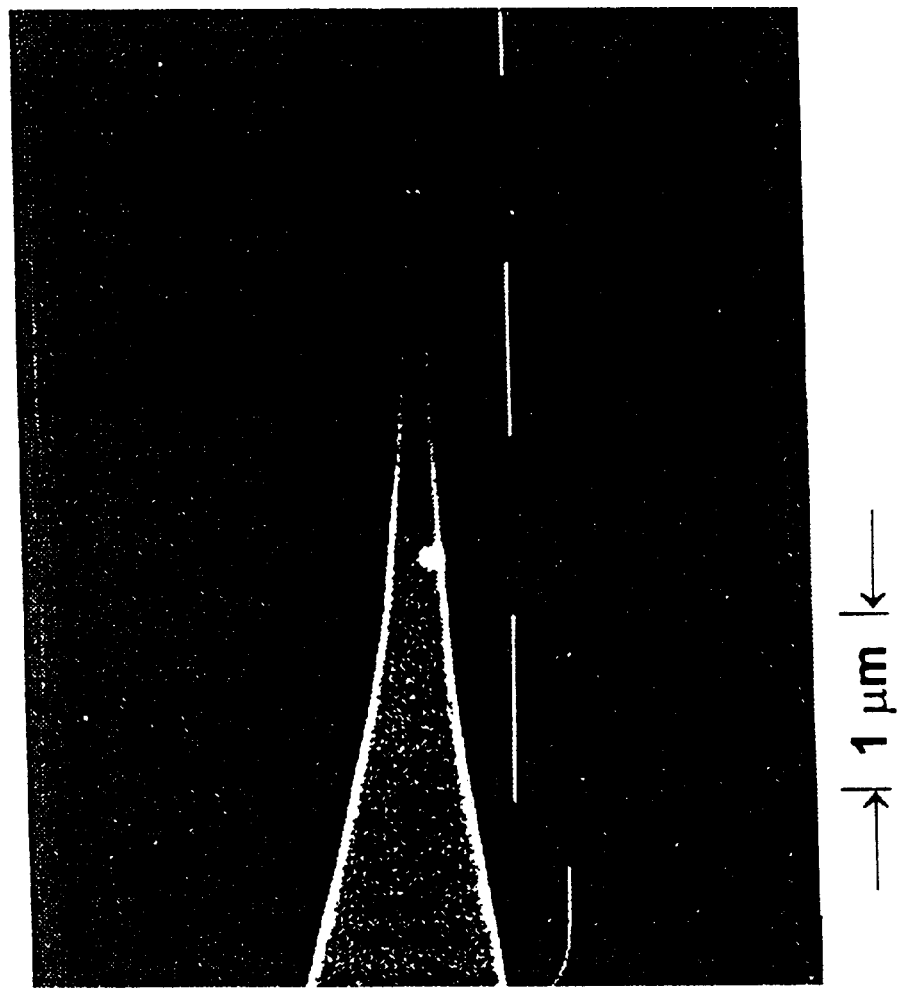
FIG. 4 is the electromicroscopic pick-up of the point of a micromechanical sensor in accordance with the invention.

The schematic cross-section in FIG. 1 shows the point 1 of the micromechanical sensor in the invention as well as a part of the beam 2, which carries the point. The point 1 consists of a basically conical shank 1a and a countersunk point 1b at the end of the shank. The side flanks of the basically conical shank 1a have positive side flank angles which measure approximately 75° to approximately 89°.

Since a multitude of structures do not have vertical side walls, but walls with positive side flank angles, the point shape in the invention with the countersunk point 1b at the end of the shank is excellently suited for the clear sampling and measuring of such structures.

The rigidity of point 1 is determined by a truncated cone, whilst a vertical cylinder determines the rigidity of normal countersunk points. At the same height L, a truncated cone has greater rigidity k.

The following applies for the truncated cone:

$$k_k = \frac{3\pi}{64} \quad E = \frac{dD^3}{L^3}$$

The following applies for the cylinder:

$$k_z = \frac{3\pi}{64} \quad E = \frac{D^4}{L^4}$$

where E=modulus of elasticity
d=smallest diameter of the truncated cone
D=greatest diameter of the truncated cone or diameter of the cylinder
L=length of the truncated cone or cylinder One further important advantage of the point 1 is that, in comparison to the usual countersunk heads, it is easier to manufacture as it has no flank angle of exactly 90°, which angle may only deviate by less than "0.5°.

The shank 1a of the point 1 of the micromechanical sensor in the invention only has to fulfil the condition of having a smaller, or at most the same, side flank angle as the structure to be measured.

The micromechanical structure in the invention can be made using the procedural stages which are described in detail in, for example, the European Patents EP-A-O 413 042, EP-A-O 413 041, EP-A-O 413 040 and EP-A-O 468 071.

It can be of particular advantage for certain applications if the beam 2, the fixing block and the point 1 of the sensor form an integrated whole which is produced micromechanically from one piece of material. One example of a material particularly suited for this is silicon.

As described in the IBM Technical Disclosure Bulletin, vol. 37, no. 07, July 1994, pages 545–546, the individual components of the micromechanical sensor can also consist of different materials.

Figure 5:
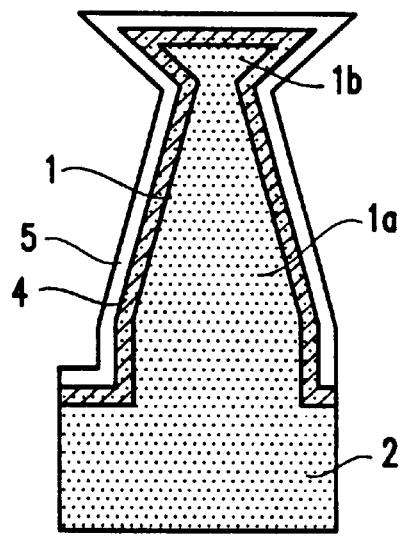
FIG. 5 is a schematic cross-section through the point of the micromechanical sensor coated with two thin layers.

Whilst maintaining the use of the basic material of silicon and the known manufacturing procedure for the micromechanical sensor, the sensor can be coated with one or more additional layers 4, 5, as can be seen in FIG. 5. To improve the rigidity of the point, a layer can be chosen which is made from a material which, in comparison to silicon, has a higher modulus of elasticity. Suitable materials with this property are, for example, silicon nitride, silicon carbide, diamond or adamantine carbon. Even organic coatings, e.g. from Teflon, are well suited due to their low friction coefficients.

As these materials are frequently electrically insulating, for some applications one or more electrically conductive or magnetic layers can be advantageous. An additional electrically conductive layer also helps in avoiding measurement problems caused by charging, dependent on the material to be examined. In the design shape shown in FIG. 5, the micromechanical sensor is coated with two thin layers 4 and 5. The first layer 4 in this example has a high modulus of elasticity and the second layer 5 is electrically conductive.

The breaking strength of the silicon point or the micromechanical sensor can also be improved by the use of metal coatings which do not have a high modulus of elasticity. Metals such as Cr, Al, Au, Pt or others can be applied using sputter processes or by chemical precipitation in the vapour phase.

Even materials which differ completely from silicon in their stress properties, such as silicon dioxide, can improve the breaking strength of silicon points.

There is an additional possibility with certain advantages in first coating the point or the micromechanical sensor with one or more layers and then converting the silicon material of the point into another material through a chemical high-temperature reaction. The result of the course of such a procedure is shown in FIG. 6.

Figure 6:
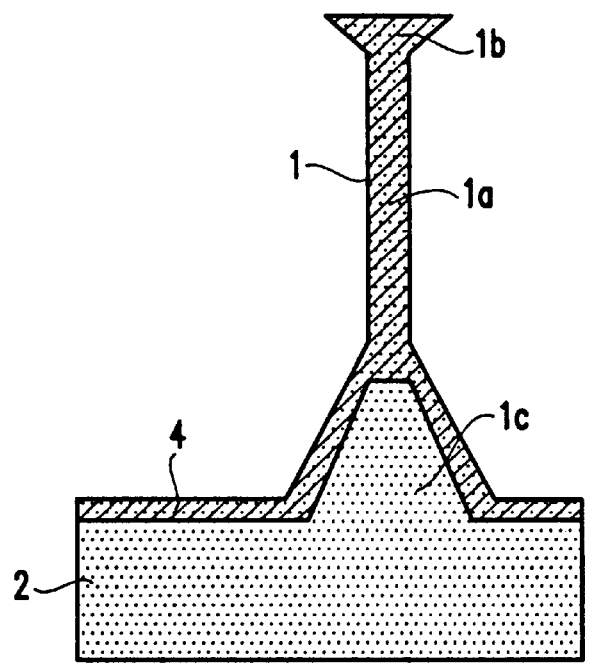
FIG. 6 is a schematic cross-section through a point, the original material of which has been converted into another material after coating with one or more thin layers and undergoing a subsequent chemical reaction.

The advantage of this method compared to the pure coating method is clear in comparison to FIGS. 5 and 6. The pure coating method increases all dimensions of the point, particularly the radius of curvature on the corners, whereas with the conversion method, excess material which has not reacted is removed.

The coating method and the conversion method can be used for improving the elastic and other properties of any shaped point.

The above-cited European Patents and technical articles are hereby incorporated herein by reference.

We claim:

1. Micromechanical sensor for Atomic Force Microscopy/Scanning Tunnel Microscopy (ATM/STM) profilometry, comprising:
    a beam supporting on a first end a point for interaction with a test surface to be sampled and having, at a second end distal from the point, a fixing block,
    wherein said point comprises a conically-shaped shank with a countersunk point at an end of said shank, said countersunk point having a truncated cone-shape, and
    wherein said conically-shaped shank has a flank angle of approximately 75° to approximately 89°.

2. Micromechanical sensor according to claim 1, wherein said beam, said fixing block and said point integrally form a unitary structure manufactured micromechanically from one piece of material.

3. Micromechanical sensor according to claim 2, wherein said material is silicon.

4. Micromechanical sensor according to claim 1, wherein said point is coated with one or more thin layers.

5. Micromechanical sensor according to claim 4, wherein said point is coated with first and second thin layers, the first layer having a high modulus of elasticity and the second layer being electrically conductive.

6. Micromechanical sensor according to claim 1, wherein said point and said beam are coated with one or more thin layers.

7. Micromechanical sensor according to claim 3, wherein said silicon material of said point is coated with one or more thin layers which render said silicon convertible into another material through a chemical reaction.

8. Micromechanical sensor according to claim 7, wherein said materials for said one or more thin layers is selected from the group consisting of silicon dioxide, silicon nitride, silicon carbide, adamantine carbon, an organic material and a metallic material.

9. The micromechanical sensor according to claim 1, wherein said countersunk point includes a predetermined rigidity determined by the truncated-cone-shape.

10. The micromechanical sensor according to claim 1, wherein side flanks of said conically-shaped shank include positive side flank angles.

11. The micromechanical sensor according to claim 1, wherein point includes flank angles other than exactly 90°, such that said point is devoid of any flank angles of exactly 90°.

12. The micromechanical sensor according to claim 1, said sensor for measuring a structure having a flank angle, wherein said shank includes a predetermined side flank angle no greater than the flank angle of said structure being measured.

13. The micromechanical sensor according to claim 1, wherein said countersunk point includes a surface which is substantially planar and substantially parallel to a plane of a surface of said beam.

14. The micromechanical sensor according to claim 13, wherein said substantially planar surface of said countersunk point is positioned at a distal end of said point for substantial opposition to the test surface.

15. A sensor for profiling a surface of a structure, comprising:

a beam supporting on a first end a point for interaction with the surface of the structure and having, at a second end distal from the point, a fixing block, wherein said point comprises a conically-shaped shank with a countersunk point at an end of said shank, said point including flank angles other than exactly 90°, such that said point is devoid of any flank angles of exactly 90°, and wherein said conically-shaped shank has a flank angle of approximately 75° to approximately 89°.

16. The sensor according to claim 15, wherein said countersunk point has a truncated cone-shape.

17. The sensor according to claim 16, wherein said point and said beam are coated with at least one thin layer.

18. The sensor according to claim 15, wherein said countersunk point includes a silicon point coated with at least one coating layer, a material for said at least one coating layer being selected from the group consisting of silicon dioxide, silicon nitride, silicon carbide, adamantine carbon, an organic material and a metallic material, wherein side flanks of said conical shank include positive side flank angles.

19. The sensor according to claim 18, wherein the countersunk point includes flank angles other than exactly 90°, such that said countersunk point is devoid of any flank angles of exactly 90°, said sensor for measuring a structure having a flank angle, wherein said shank includes a predetermined flank angle no greater than the flank angle of said structure being measured, wherein said countersunk point includes a surface which is substantially planar and is parallel to a surface of said beam, and which is positioned at a distal end of said point for substantial opposition to the surface to be profiled.

\* \* \* \* \*